(12) United States Patent
Yasuhiko et al.

(10) Patent No.: US 12,332,158 B2
(45) Date of Patent: Jun. 17, 2025

(54) OBSERVATION DEVICE AND OBSERVATION METHOD

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 176 days.

(21) Appl. No.: 17/917,044

(22) PCT Filed: Mar. 3, 2021

(86) PCT No.: PCT/JP2021/008235
§ 371 (c)(1),
(2) Date: Oct. 5, 2022

(87) PCT Pub. No.: WO2021/205783
PCT Pub. Date: Oct. 14, 2021

(65) Prior Publication Data
US 2023/0152206 A1 May 18, 2023

(30) Foreign Application Priority Data
Apr. 10, 2020 (JP) ................................. 2020-070805

(51) Int. Cl.
*G01N 15/1434* (2024.01)
*G02B 21/06* (2006.01)
(Continued)

(52) U.S. Cl.
CPC ......... *G01N 15/1434* (2013.01); *G02B 21/06* (2013.01); *G02B 21/361* (2013.01);
(Continued)

(58) Field of Classification Search
CPC .............. G01B 9/0209; G01B 2290/70; G01B 9/02057; G01B 11/2441; G01B 9/02027;
(Continued)

(56) References Cited

U.S. PATENT DOCUMENTS

| 5,420,717 | A | 5/1995 | Tabata |
| 10,132,609 | B2 | 11/2018 | Popescu et al. |

(Continued)

FOREIGN PATENT DOCUMENTS

| CN | 101334520 A | 12/2008 |
| CN | 101726844 A * | 6/2010 |

(Continued)

OTHER PUBLICATIONS

Shibata Shuhei et al, "Video-rate full-stokes imaging polarimeter using two polarization cameras", APXIV, Optical Engineering 58(10), Oct. 1, 2019, p. 103103-1-p. 103103-7, XP060152792.
(Continued)

*Primary Examiner* — Michael P Stafira
(74) *Attorney, Agent, or Firm* — Faegre Drinker Biddle & Reath LLP

(57) ABSTRACT

An observation apparatus includes a light source, a lens, a polarizer, a first prism, a condenser lens, an objective lens, a second prism, a ¼ wave plate, a lens, a polarization camera, and an analysis unit. Each of the first prism and the second prism is, for example, a Wollaston prism or a Nomarski prism. The ¼ wave plate inputs light output from the second prism, and outputs two circularly polarized light beams having different rotation directions. The polarization camera inputs two light beams being circularly polarized in different rotation directions by the ¼ wave plate, and acquires an interference image on an imaging plane for each of three or more polarization components.

6 Claims, 13 Drawing Sheets

(51) Int. Cl.
*G02B 21/36* (2006.01)
*G01N 15/10* (2006.01)
*G01N 15/14* (2006.01)

(52) U.S. Cl.
CPC ............... *G01N 2015/1006* (2013.01); *G01N 2015/1497* (2013.01)

(58) Field of Classification Search
CPC ............ G01B 2290/45; G01B 9/02043; G01B 9/02084; G01B 9/02088; G01B 9/02072; G01B 11/0675; G01B 9/02007; G01B 9/0201; G01B 9/02039; G01B 9/02044; G01B 9/02068; G01B 9/02074; G01B 9/02077; G01B 9/02004; G01B 9/023; G01B 9/02; G01B 11/02; G01B 11/06; G01B 2290/50; G01B 9/02083; G01B 2210/56; G01B 11/30; G01B 2290/30; G01B 9/02011; G01B 9/02019; G01B 9/02022; G01B 9/02029; G01B 9/0203; G01B 9/02087; G01B 9/04; G01N 21/211; G01N 21/21; G01N 21/6458; G01N 2021/1787; G01N 21/9501; G01N 15/1434; G01N 2015/1006; G01N 2015/1497; G01N 2021/9513; G01N 21/8422; G01N 21/45; G01N 2021/6463; G01N 2021/6478; G01N 21/27; G01N 2201/06113; G01N 2201/0683; G01N 33/483; G01N 21/95607; G01N 21/47; G01N 2021/6423; G01N 21/6428; G01N 21/956; G01N 33/588
See application file for complete search history.

(56) References Cited

U.S. PATENT DOCUMENTS

| | | | |
|---|---|---|---|
| 2011/0096393 A1 | 4/2011 | Araki | |
| 2015/0185460 A1* | 7/2015 | Nakasho | G02B 21/0056 250/459.1 |
| 2018/0002670 A1* | 1/2018 | Ishiwata | G06T 7/11 |
| 2018/0143001 A1 | 5/2018 | Popescu et al. | |

FOREIGN PATENT DOCUMENTS

| | | | | |
|---|---|---|---|---|
| CN | 101726844 B | * | 11/2011 | |
| CN | 103403528 A | | 11/2013 | |
| CN | 108415143 A | | 8/2018 | |
| DE | 112015002931 T5 | * | 3/2017 | ............ G01N 21/64 |
| EP | 2317363 A2 | | 5/2011 | |
| JP | H05232384 A | * | 9/1993 | |
| JP | 2001075009 A | * | 3/2001 | ......... G02B 21/0044 |
| JP | 2003005080 A | * | 1/2003 | |
| JP | 2006271210 A | * | 10/2006 | ............ C12M 23/50 |
| JP | 2007-187945 A | | 7/2007 | |
| JP | 2008310193 A | | 12/2008 | |
| JP | WO2008105156 A1 | * | 6/2010 | |
| JP | 5523664 B2 | * | 6/2014 | ......... G01B 9/02081 |
| JP | 2014209085 A | * | 11/2014 | ......... G01N 15/1475 |
| JP | 2018055113 A | * | 4/2018 | ................ G01J 9/00 |
| JP | 6693030 B2 | * | 5/2020 | ................ G01J 9/00 |
| WO | WO-2008/105156 A1 | | 9/2008 | |
| WO | WO-2016185619 A1 | * | 11/2016 | ............ C12M 41/46 |
| WO | WO-2019053768 A1 | * | 3/2019 | ......... G02B 21/0032 |
| WO | WO-2019097587 A1 | * | 5/2019 | ................ G01J 9/00 |

OTHER PUBLICATIONS

International Preliminary Report on Patentability mailed Oct. 20, 2022 for PCT/JP2021/008235.

Shibata, Shuhei et al., "Video-rate quantitative phase analysis by a DIC microscope using a polarization camera," Biomedical Optics EXPRESS, vol. 10, No. 3, 2019, pp. 1273-1281.

* cited by examiner

OBSERVATION DEVICE AND OBSERVATION METHOD

TECHNICAL FIELD

The present disclosure relates to an observation apparatus and an observation method.

BACKGROUND ART

It is difficult to observe a transparent observation object such as, for example, a cell with a normal microscope, and therefore, an observation apparatus capable of acquiring a phase image of the observation object such as a quantitative phase microscope is used in general. Several implementation methods of the above observation apparatus are known.

One of conventional arts (hereinafter referred to as "conventional art 1") uses a Michelson interferometer or a Mach-Zehnder interferometer in which splitting and combining of two light beams are performed, and places an observation object on an optical path of one of the two light beams. Further, in the conventional art 1, an optical path difference (phase difference) between the two light beams is sequentially set to each value by moving a mirror or the like on the optical path, a plurality of interference images of the observation object are acquired, and a phase image is generated based on the plurality of interference images.

An observation apparatus described in Patent Document 1 (hereinafter referred to as "conventional art 2") is an application of a differential interference contrast microscope. In the conventional art 2, linearly polarized light output from a light source and passed through a first polarizer is split by a first prism into two linearly polarized light beams having oscillation planes orthogonal to each other and slightly shifted by an optical path, and the two linearly polarized light beams passed through an observation object are combined by a second prism and passed through a second polarizer to interfere with each other, thereby acquiring an interference image. A phase difference between the two light beams is sequentially set to each value by a spatial light modulator interposed between the second prism and the second polarizer to acquire a plurality of interference images. Further, a phase differential image is generated based on the plurality of interference images, and a phase image is generated based on the phase differential image.

An observation apparatus described in Non Patent Document 1 (hereinafter referred to as "conventional art 3") is also an application of the differential interference contrast microscope. In the conventional art 3, a polarization camera is attached to a camera port of a commercially available differential interference contrast microscope, and a plurality of interference images are simultaneously acquired by the polarization camera. Further, a phase differential image is generated based on the plurality of interference images, and a phase image is generated based on the phase differential image.

Further, in the above observation apparatuses, an amplitude image of the observation object can be acquired in addition to the phase image, and further, a complex amplitude image can be acquired.

CITATION LIST

Patent Literature

Patent Document 1: US Patent Publication No. 10132609

Non Patent Literature

Non Patent Document 1: S. Shibata et al., "Video-rate quantitative phase analysis by a DIC microscope using a polarization camera", Biomed. Opt. Express Vol. 10, pp. 1273-1281, 2019

SUMMARY OF INVENTION

Technical Problem

The conventional art 1 can obtain a phase image excellent in quantitativeness. However, since the conventional art 1 uses the Michelson interferometer or the Mach-Zehnder interferometer in which splitting and combining of the two light beams are performed, adjustment of the optical system is not easy and vibration resistance is poor. Further, since the conventional art 1 acquires the plurality of interference images by sequentially setting the optical path difference (phase difference) between the two light beams to each value, it takes time for acquiring the plurality of interference images.

The conventional art 2 may solve the problems of optical system adjustment and vibration resistance. However, in the conventional art 2, since the plurality of interference images are acquired by sequentially setting the optical path difference (phase difference) between the two light beams to each value, it takes time for acquiring the plurality of interference images.

The conventional art 3 may solve the problems of optical system adjustment and vibration resistance, and may also solve the problem of time for acquiring the interference images. However, in the conventional art 3, an accurate phase differential image cannot be obtained, and therefore, the phase image is generated by performing necessary processing based on the phase differential image under an approximation condition of an assumption that a phase change is small. Therefore, the obtained phase image is poor in quantitativeness.

An object of an embodiment is to provide an observation apparatus and an observation method capable of easily adjusting an optical system and obtaining a complex amplitude image with improved quantitativeness in a short time.

Solution to Problem

An embodiment is an observation apparatus. The observation apparatus includes (1) a light source for outputting spatially incoherent light; (2) an irradiation optical system for focusing light output from the light source and irradiating an observation object with the light; (3) a polarizer provided on an optical path of the irradiation optical system, and for inputting the light output from the light source and outputting linearly polarized light; (4) a first prism provided on the optical path of the irradiation optical system and between the polarizer and the observation object, and for inputting light output from the polarizer and outputting two linearly polarized light beams orthogonal to each other; (5) an imaging optical system for forming an image by inputting light generated in the observation object in response to irradiation of the observation object with the light by the irradiation optical system; (6) a second prism provided on an optical path of the imaging optical system, and for combining two light beams output from the observation object and outputting light; (7) a polarization conversion element provided on the optical path of the imaging optical system and at a subsequent stage of the second prism, and for inputting the light output from the second prism and outputting two circularly polarized light beams having different rotation directions; (8) a polarization camera having an imaging plane disposed at a position where the image is formed by the imaging optical system, and for inputting the two circularly polarized light beams having different rotation directions output from the polarization conversion element and acquiring an interference image on the imaging plane for each of three or more polarization components; and (9) an analysis unit for generating a complex amplitude image of the observation object based on the interference image for each of the three or more polarization components acquired by the polarization camera.

An embodiment is an optical module. The optical module is an optical module being detachably attached to a camera port of a differential interference contrast microscope, and includes (1) a relay optical system constituting a part of an imaging optical system for forming an image by inputting light generated in an observation object placed in the differential interference contrast microscope, and for inputting light output from a second prism of the differential interference contrast microscope through the camera port; (2) a polarization conversion element provided on an optical path of the relay optical system, and for inputting the light and outputting two circularly polarized light beams having different rotation directions; and (3) a polarization camera having an imaging plane disposed at a position where the image is formed by the relay optical system, and for inputting the two circularly polarized light beams having different rotation directions output from the polarization conversion element and acquiring an interference image on the imaging plane for each of three or more polarization components.

An embodiment is an observation method. The observation method includes (1) outputting spatially incoherent light from a light source; (2) by a polarizer provided on an optical path of an irradiation optical system for focusing light output from the light source and irradiating an observation object with the light, inputting the light output from the light source and outputting linearly polarized light; (3) by a first prism provided on the optical path of the irradiation optical system and between the polarizer and the observation object, inputting light output from the polarizer and outputting two linearly polarized light beams orthogonal to each other; (4) by a second prism provided on an optical path of an imaging optical system for forming an image by inputting light generated in the observation object in response to irradiation of the observation object with the light by the irradiation optical system, combining two light beams output from the observation object and outputting light; (5) by a polarization conversion element provided on the optical path of the imaging optical system and at a subsequent stage of the second prism, inputting the light output from the second prism, converting the light into two circularly polarized light beams having different rotation directions and outputting the light beams; (6) by a polarization camera having an imaging plane disposed at a position where the image is formed by the imaging optical system, inputting the two circularly polarized light beams having different rotation directions output from the polarization conversion element and acquiring an interference image on the imaging plane for each of three or more polarization components; and (7) generating a complex amplitude image of the observation object based on the interference image for each of the three or more polarization components acquired by the polarization camera.

Advantageous Effects of Invention

According to the observation apparatus and the observation method of the embodiments, an optical system can be easily adjusted, and a complex amplitude image can be obtained with improved quantitativeness in a short time.

DESCRIPTION OF EMBODIMENTS

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples.

Figure 1:
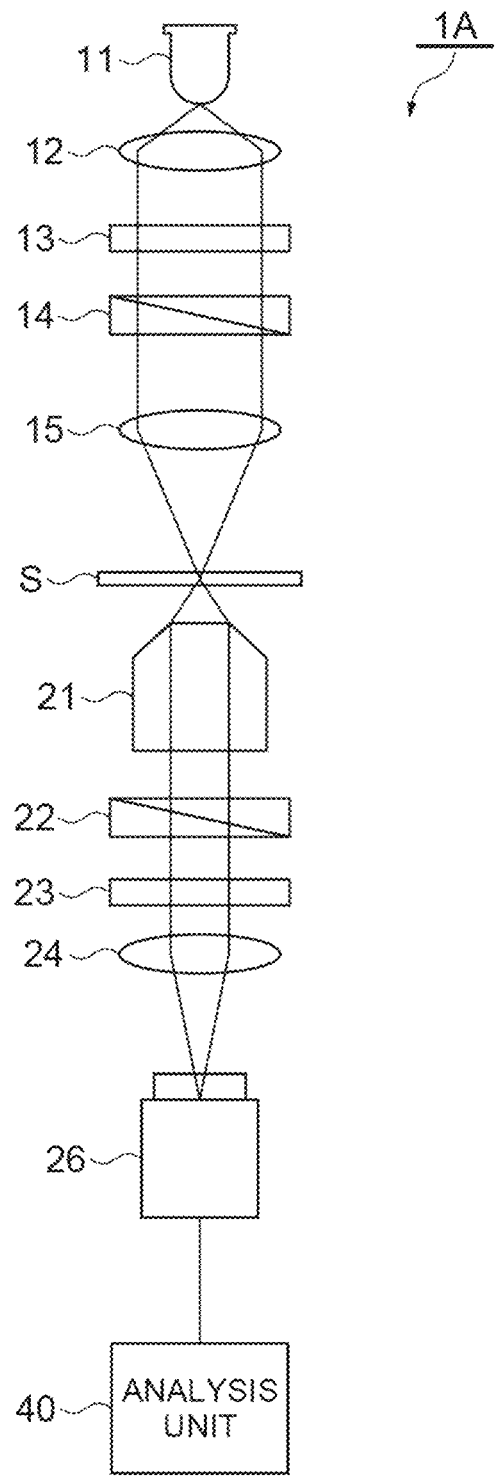
FIG. 1 is a diagram illustrating a configuration of an observation apparatus 1A of a first embodiment.

FIG. 1 is a diagram illustrating a configuration of an observation apparatus 1A of a first embodiment. The observation apparatus 1A includes a light source 11, a lens 12, a polarizer 13, a first prism 14, a condenser lens 15, an objective lens 21, a second prism 22, a ¼ wave plate 23, a lens 24, a polarization camera 26, and an analysis unit 40. In the observation apparatus 1A, the light source 11, the lens 12, the polarizer 13, the first prism 14, the condenser lens 15, the objective lens 21, the second prism 22, the ¼ wave plate 23, the lens 24, and the polarization camera 26 are optically coupled.

The lens 12, the polarizer 13, the first prism 14, and the condenser lens 15 are sequentially provided on an optical path of an irradiation optical system for focusing light output from the light source 11 and irradiating an observation object S with the light. Further, the objective lens 21, the second prism 22, the ¼ wave plate 23, and the lens 24 are sequentially provided on an optical path of an imaging optical system for forming an image on an imaging plane of the polarization camera 26 by inputting light generated in the observation object S in response to irradiation of the observation object S with the light by the irradiation optical system.

The light source 11 outputs spatially incoherent light. The light output from the light source 11 may be temporally coherent or temporally incoherent. The light output from the light source 11 may be linearly polarized light or unpolarized light. The light source 11 includes, for example, a halogen lamp, a light emitting diode, or a laser diode, and further, preferably includes a diffuser plate at a subsequent stage thereof.

The lens 12 is optically coupled to the light source 11. The lens 12 collimates the light output from the light source 11, and outputs the light to the polarizer 13.

The polarizer 13 is optically coupled to the lens 12. The polarizer 13 inputs the light collimated and output by the lens 12, and outputs linearly polarized light having a polarization plane (oscillation plane) according to an orientation of an optic axis of the polarizer 13 to the first prism 14.

The first prism 14 is optically coupled to the polarizer 13. The first prism 14 inputs the linearly polarized light output from the polarizer 13, and outputs two linearly polarized light beams orthogonal to each other in different directions. A polarization plane of each of the two linearly polarized light beams output from the first prism 14 and orthogonal to each other is inclined by 45° with respect to the polarization plane of the linearly polarized light input from the polarizer 13 to the first prism 14.

The condenser lens 15 is optically coupled to the first prism 14. The condenser lens 15 focuses the two linearly polarized light beams orthogonal to each other output from the first prism 14 and irradiates the observation object S with the light beams. The two linearly polarized light beams orthogonal to each other output from the first prism 14 travel in different directions after being output from the first prism 14, and thus, focusing positions on the observation object S by the condenser lens 15 are slightly different.

The objective lens 21 inputs the two linearly polarized light beams orthogonal to each other and output from the observation object S in response to irradiation of the observation object S with the light by the irradiation optical system, collimates the light beams, and outputs the light beams to the second prism 22.

The second prism 22 is optically coupled to the objective lens 21. The second prism 22 inputs the two linearly polarized light beams orthogonal to each other and collimated and output by the objective lens 21, combines the light beams in the optical paths shifted by the first prism 14, and outputs the light to the ¼ wave plate 23.

The ¼ wave plate 23 is a polarization conversion element being optically coupled to the second prism 22. The ¼ wave plate 23 inputs the light output from the second prism 22, and outputs two circularly polarized light beams having different rotation directions. When the light output from the light source 11 is temporally incoherent, the ¼ wave plate 23 is preferably an achromatic wave plate or the like having small wavelength dependency.

The lens 24 is optically coupled to the ¼ wave plate 23. The lens 24 inputs the two circularly polarized light beams having different rotation directions output from the ¼ wave plate 23, and forms an image on the imaging plane of the polarization camera 26.

The polarization camera 26 is optically coupled to the lens 24. The polarization camera 26 has the imaging plane disposed at a position where the image is formed by the imaging optical system. The polarization camera 26 inputs the two light beams being circularly polarized in different rotation directions by the ¼ wave plate 23, and acquires an interference image on the imaging plane for each of three or more polarization components. In addition, circular polarization in the present invention is not limited to the case where a phase difference is ±π/2 [rad] and amplitudes are equal between electric field vectors in two directions orthogonal to each other, and includes elliptical polarization.

The analysis unit 40 generates a complex amplitude image (an amplitude image and a phase image) of the observation object S based on the interference images respectively for the three or more polarization components acquired by the polarization camera 26. The analysis unit 40 is, for example, a computer.

The analysis unit 40 includes an operation unit including a CPU for performing operational processing such as generation of the complex amplitude image, a storage unit including a hard disk drive, a RAM, a ROM, and the like for storing the interference image, the complex amplitude image, and the like, a display unit including a liquid crystal display for displaying the interference image, the complex amplitude image, and the like, and an input unit including a keyboard, a mouse, and the like for receiving input of various conditions at the time of acquisition of the interference image and display of the image. The analysis unit 40 may be constituted by a smart device such as a tablet terminal including a touch panel and the like as the input unit. Further, the operation unit and the storage unit of the analysis unit 40 may be constituted by a field-programmable gate array (FPGA) or a microcomputer.

The configuration from the light source 11 to the polarization camera 26 corresponds to a configuration in which an analyzer provided at a subsequent stage of the second prism 22 is removed in a configuration of a normal differential interference contrast microscope and the ¼ wave plate 23 and the polarization camera 26 are provided. Each of the first prism 14 and the second prism 22 may be a Wollaston prism or a Nomarski prism used in a normal differential interference contrast microscope.

Figure 2:
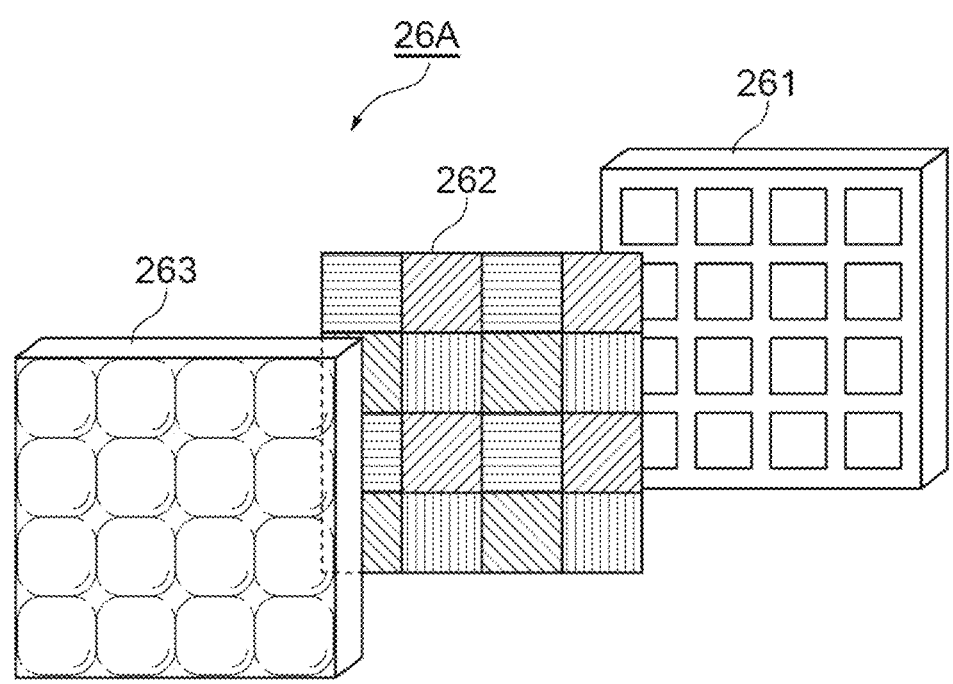
FIG. 2 is a diagram illustrating a configuration example of an image sensor of a polarization camera 26.

FIG. 2 is a diagram illustrating a configuration example of an image sensor of the polarization camera 26. An image sensor 26A illustrated in this diagram has a configuration in which a plurality of pixels are arranged two-dimensionally in the imaging plane, and can acquire a two-dimensional interference image.

The image sensor 26A includes a photodiode array 261 formed on a semiconductor substrate, a polarizer array 262 provided on the photodiode array, and a lens array 263 provided on the polarizer array, and has a configuration in which these are stacked. In the photodiode array 261, a plurality of photodiodes are arranged two-dimensionally. One polarizer in the polarizer array 262 is provided corresponding to each photodiode in the photodiode array 261, and one lens in the lens array 263 is provided corresponding thereto.

Each polarizer of the polarizer array 262 has an optic axis in any orientation of four orientations (0°, 45°, 90°, 135°). In this diagram, an orientation of hatching in each polarizer of the polarizer array 262 indicates the orientation of the optic axis of the polarizer.

By using the above image sensor 26A, two-dimensional images for linear polarizations of four orientations can be simultaneously acquired. An image sensor (Polarsens (registered trademark)) commercialized by Sony Corporation has the configuration illustrated in this diagram. Further, an image sensor (Area Scan Polarization Sensor) commercialized by Teledyne DALSA also has the configuration illustrated in this diagram.

Figure 3:
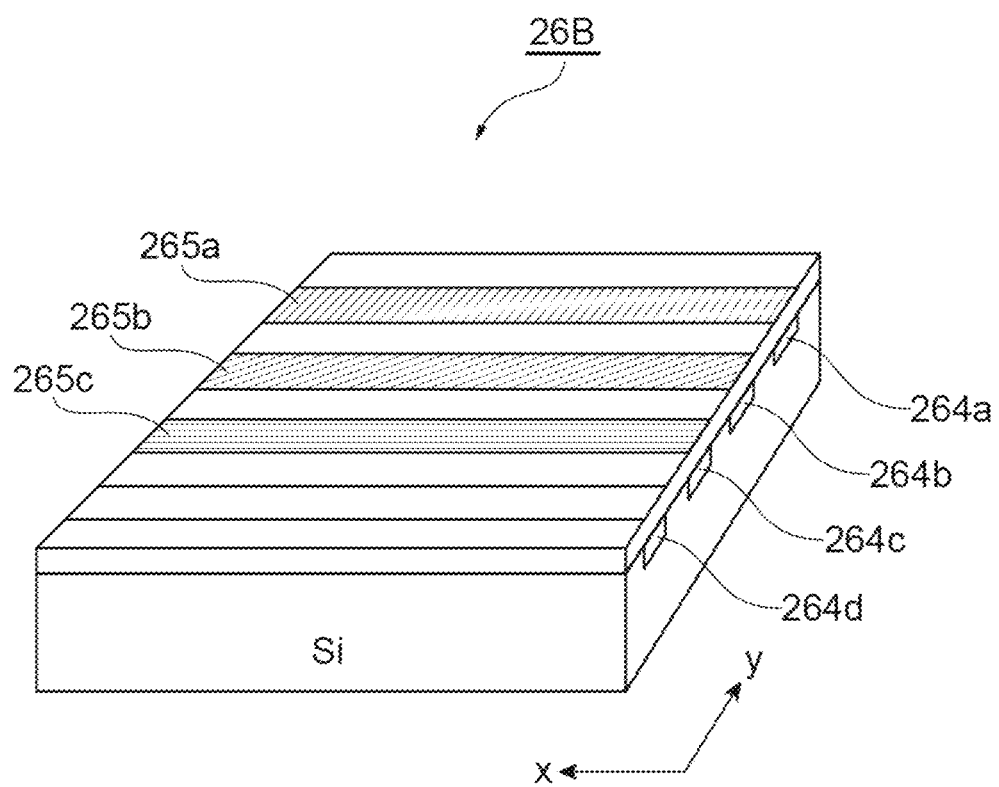
FIG. 3 is a diagram illustrating another configuration example of the image sensor of the polarization camera 26.

FIG. 3 is a diagram illustrating another configuration example of the image sensor of the polarization camera 26. An image sensor 26B illustrated in this diagram has a configuration in which a plurality of pixels are arranged one-dimensionally in the imaging plane, and can acquire a one-dimensional interference image.

The image sensor 26B includes photodiode arrays 264a to 264d formed on a semiconductor substrate, and polarizers 265a to 265c provided on the photodiode arrays 264a to 264c. A polarizer is not provided on the photodiode array 264d. In each of the photodiode arrays 264a to 264d, a plurality of photodiodes are arranged one-dimensionally in an x direction. The photodiode arrays 264a to 264d are arranged in parallel in a y direction.

An orientation of an optic axis of the polarizer 265a on the photodiode array 264a is 0°, an orientation of an optic axis of the polarizer 265b on the photodiode array 264b is 135°, and an orientation of an optic axis of the polarizer 265c on the photodiode array 264c is 90°. In this diagram, an orientation of hatching in each polarizer indicates the orientation of the optic axis of the polarizer.

By using the above image sensor 26B, one-dimensional images for linear polarizations of three orientations can be simultaneously acquired. Further, by relatively moving the observation object S in a direction (for example, the y direction) different from the x direction, it is possible to simultaneously acquire two-dimensional images for the linear polarizations of the three orientations. For example, the observation object S may be a cell which moves together with a fluid in a transparent tube as in flow cytometry. An image sensor (Line Scan Polarization Sensor) commercialized by Teledyne DALSA has the configuration illustrated in this diagram.

Next, a method of acquiring the complex amplitude image of the observation object S using the observation apparatus 1A will be described.

Spatially incoherent light output from the light source 11 is collimated by the lens 12, made into linearly polarized light having a polarization plane according to the orientation of the optic axis of the polarizer 13, and input to the first prism 14. When the linearly polarized light is input from the polarizer 13 to the first prism 14, two linearly polarized light beams orthogonal to each other are output from the first prism 14 in different directions, and are focused on and applied to the observation object S by the condenser lens 15.

Two linearly polarized light beams orthogonal to each other output from the observation object S in response to irradiation of the observation object S with the light are collimated by the objective lens 21 and input to the second prism 22. The second prism 22 combines the optical paths shifted by the first prism 14, and the ¼ wave plate 23 converts the light into two circularly polarized light beams having different rotation directions. The two circularly polarized light beams having different rotation directions output from the ¼ wave plate 23 form an image on the imaging plane of the polarization camera 26 by the lens 24.

When the two light beams being circularly polarized in different rotation directions by the ¼ wave plate 23 are input, the polarization camera 26 acquires an interference image on the imaging plane for each of three or more polarization components (that is, three or more interference images having different phase differences). Further, the analysis unit 40 generates a complex amplitude image of the observation object S based on the three or more interference images acquired by the polarization camera 26.

Next, capability of acquiring the complex amplitude image of the observation object S by the observation apparatus 1A or the observation method of the present embodiment will be described in detail. In the following description, for ease of explanation, it is assumed that the light source 11 outputs spatially coherent light. Further, it is assumed that the polarization camera 26 can acquire four interference images whose phase differences are different by 90° as illustrated in FIG. 2.

In respective polarization states of light, a vector representing a horizontal polarization is set to $e_H$, a vector representing a vertical polarization is set to $e_V$, a vector representing a 45° polarization is set to $e_D$, a vector representing a 135° polarization is set to $e_A$, a vector representing a right-handed circular polarization is set to $e_R$, and a vector representing a left-handed circular polarization is set to $e_L$. There are relationships of the following Formulas (1) to (4) between the above vectors. i is an imaginary unit.

[Formula 1]
$$e_D = \frac{1}{\sqrt{2}}(e_H + e_V) \tag{1}$$

[Formula 2]
$$e_A = \frac{1}{\sqrt{2}}(e_H - e_V) \tag{2}$$

[Formula 3]
$$e_R = \frac{1}{\sqrt{2}}(e_H + i \cdot e_V) \tag{3}$$

[Formula 4]
$$e_L = \frac{1}{\sqrt{2}}(e_H - i \cdot e_V) \tag{4}$$

When circularly polarized light is input to a polarizer, a phase of light output from the polarizer is represented by an inner product of the vector of the polarization state of the output light (any of $e_H$, $e_V$, $e_D$, and $e_A$) and the vector of the polarization state of the input light (any of $e_R$ and $e_L$). For the inner products between the two vectors, there are relationships of the following Formulas (5) to (12). By using these relationships, an interference image corresponding to each phase shift amount can be acquired.

[Formula 5]
$$e_H \cdot e_R = \frac{1}{\sqrt{2}} \tag{5}$$

[Formula 6]
$$e_V \cdot e_R = \frac{1}{\sqrt{2}} i \tag{6}$$

[Formula 7]
$$e_D \cdot e_R = \frac{1}{\sqrt{2}} e^{\frac{\pi}{4} i} \tag{7}$$

[Formula 8]
$$e_A \cdot e_R = \frac{1}{\sqrt{2}} e^{\frac{-\pi}{4} i} \tag{8}$$

[Formula 9]
$$e_H \cdot e_L = \frac{1}{\sqrt{2}} \tag{9}$$

[Formula 10]
$$e_V \cdot e_L = -\frac{1}{\sqrt{2}} i \tag{10}$$

[Formula 11]

$$e_D \cdot e_L = \frac{1}{\sqrt{2}} e^{\frac{-\pi}{4}i} \quad (11)$$

[Formula 12]

$$e_A \cdot e_L = \frac{1}{\sqrt{2}} e^{\frac{\pi}{4}i} \quad (12)$$

Since $e_H \cdot e_R$ and $e_H \cdot e_L$ have the same phase, when two circularly polarized light beams having different rotation directions are projected onto the horizontal polarization by the polarizer, two light beams output from the polarizer have the same phase. Since $e_V \cdot e_R$ and $e_V \cdot e_L$ have opposite phases, when two circularly polarized light beams having different rotation directions are projected onto the vertical polarization by the polarizer, a phase difference between two light beams output from the polarizer is 180°.

Since phases of $e_D \cdot e_R$ and $e_D \cdot e_L$ are different by 90°, when two circularly polarized light beams having different rotation directions are projected onto the 45° polarization by the polarizer, a phase difference between two light beams output from the polarizer is 90°. Since phases of $e_A \cdot e_R$ and $e_A \cdot e_L$ are different by 270°, when two circularly polarized light beams having different rotation directions are projected onto the 135° polarization by the polarizer, a phase difference between two light beams output from the polarizer is 270°.

When an electric field of light to be measured is set to U(r), a wavefront of light input to the polarization camera 26 is represented by the following Formula (13). r is a variable indicating a position. The variable r in a first term of this Formula and the variable r+δr in a second term are due to the fact that focusing regions of two linearly polarized light beams orthogonal to each other are slightly different when focused irradiation is performed on the observation object S by the condenser lens 15.

[Formula 13]

$$U(r) \cdot e_R + U(r+\delta r) \cdot e_L \quad (13)$$

From the above Formulas, an interference image $I_{\theta n}$ acquired by the polarization camera 26 is represented by the following Formulas (14) and (15). $\theta_n$ indicates an orientation of an optic axis of four types of polarizers of the polarization camera 26, and is a value of 0°, 45°, 90°, or 135°. $\phi_n$ indicates a phase difference after two circularly polarized light beams having different rotation directions pass through the polarizer, and is a value of 0, π/2, π, or 3π/2. There is a one-to-one correspondence between $\theta_n$ and $\phi_2$. From Formula (14), the following Formula (16) is obtained.

[Formula 14]

$$I_{\theta n}(r) = I(r) + I(r+\delta r) \\ + 2\sqrt{I(r) \cdot I(r+\delta r)} \cos[\phi(r+\delta r) - \phi(r) + \phi_n] \quad (14)$$

[Formula 15]

$$I(r) = |U(r)|^2 \quad (15)$$

[Formula 16]

$$I_0(r) - I_{90}(r) + i \cdot \{I_{45}(r) - I_{135}(r)\} \quad (16) \\ \propto \sqrt{I(r) \cdot I(r+\delta r)} \exp[i \cdot \{\phi(r+\delta r) - \phi(r)\}] \\ \approx I(r) \cdot \exp[i \cdot \nabla \phi(r)]$$

An absolute value of Formula (16) represents an amplitude image. A phase of Formula (16) represents a phase differential image obtained by spatially phase-differentiating a wavefront. For reconstructing a phase image from the phase differential image, basically, integration may be performed in a differential direction. A complex amplitude image can be obtained from the amplitude image and the phase image.

As described above, in the present embodiment, the two light beams propagate coaxially, and thus, adjustment of an optical system is easy, and a mechanism for stabilization of an optical path length and the like is not necessary, and vibration resistance is excellent. In the present embodiment, since the interference images of the observation object in which the phase difference between the two light beams is set to respective values can be acquired simultaneously (in a single shot), a time required for acquiring the plurality of interference images is short, and thus, it is superior to the conventional art 2. Further, compared to the conventional art 3, quantitativeness of the phase image obtained in the present embodiment is excellent.

Next, configurations of other embodiments will be described. In addition, the same elements as those in the configuration of the observation apparatus 1A illustrated in FIG. 1 are denoted by the same reference signs, and redundant description will be omitted. These have the same effects as the observation apparatus 1A of the first embodiment illustrated in FIG. 1.

Figure 4:
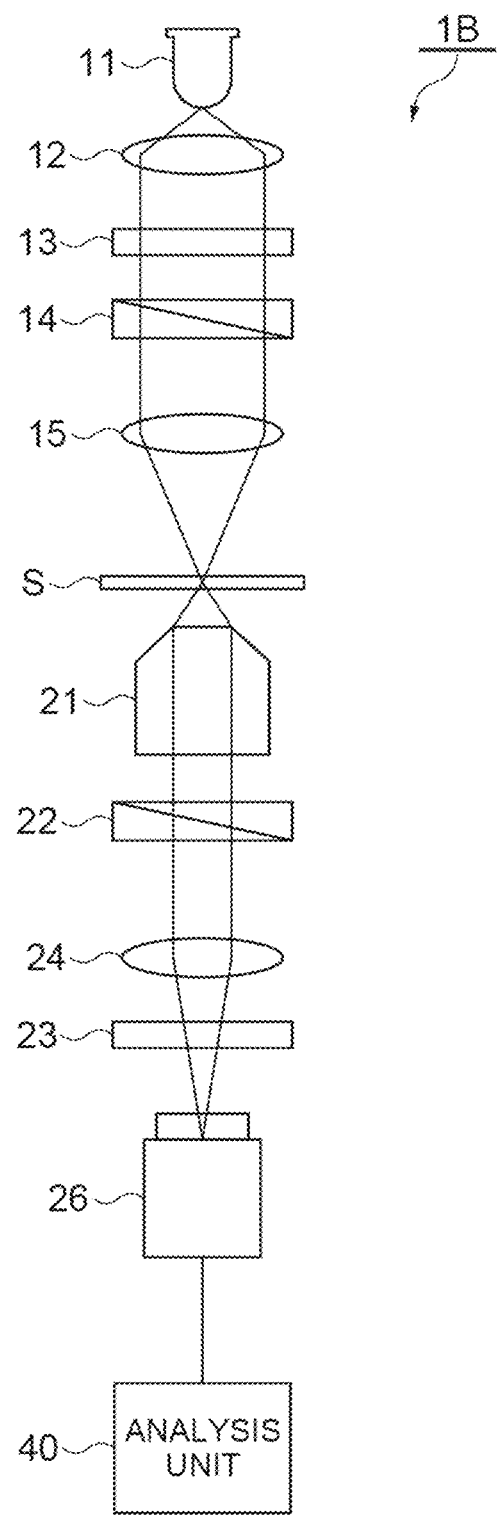
FIG. 4 is a diagram illustrating a configuration of an observation apparatus 1B of a second embodiment.

FIG. 4 is a diagram illustrating a configuration of an observation apparatus 1B of a second embodiment. As compared with the observation apparatus 1A (FIG. 1) of the first embodiment, the observation apparatus 1B (FIG. 4) of the second embodiment is different in the position where the ¼ wave plate 23 is provided. In the present embodiment, the ¼ wave plate 23 is provided between the lens 24 and the polarization camera 26. The ¼ wave plate 23 may be provided at any position between the second prism 22 and the polarization camera 26, however, for reducing influence of aberration, the configuration of the observation apparatus 1A of the first embodiment in which the ¼ wave plate is provided at a position where the light is collimated is more preferable.

Figure 5:
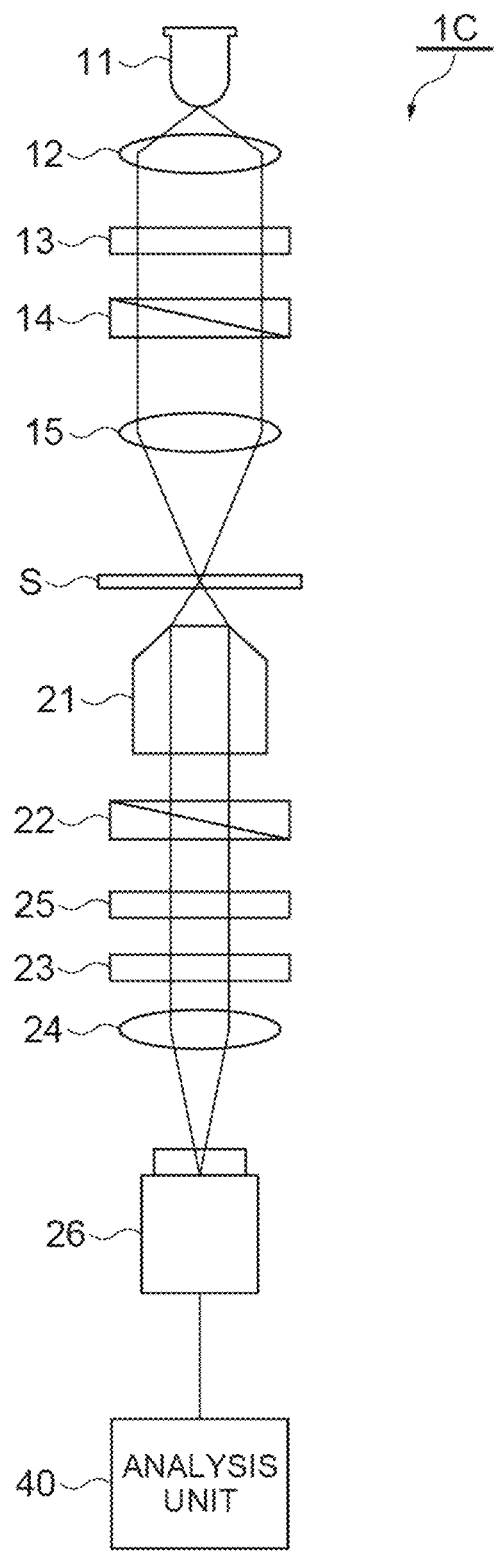
FIG. 5 is a diagram illustrating a configuration of an observation apparatus 1C of a third embodiment.

FIG. 5 is a diagram illustrating a configuration of an observation apparatus 1C of a third embodiment. As compared with the observation apparatus 1A (FIG. 1) of the first embodiment, the observation apparatus 1C (FIG. 5) of the third embodiment is different in that a wave plate 25 is provided between the second prism 22 and the ¼ wave plate 23.

Figure 6:
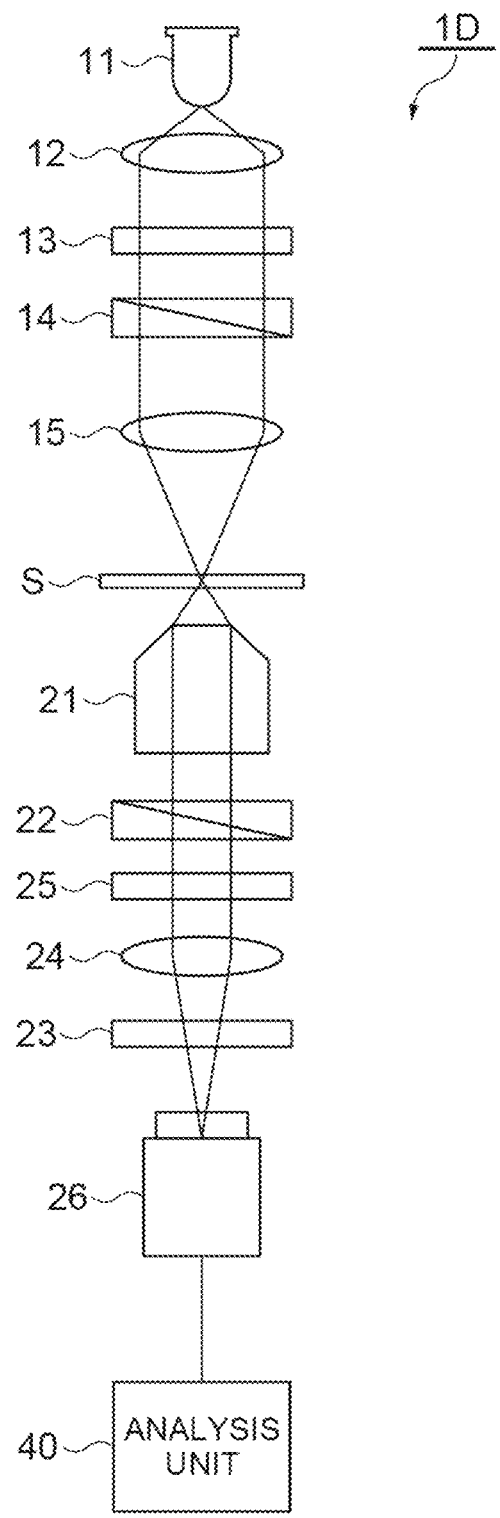
FIG. 6 is a diagram illustrating a configuration of an observation apparatus 1D of a fourth embodiment.

FIG. 6 is a diagram illustrating a configuration of an observation apparatus 1D of a fourth embodiment. As compared with the observation apparatus 1B (FIG. 4) of the second embodiment, the observation apparatus 1D (FIG. 6) of the fourth embodiment is different in that the wave plate 25 is provided between the second prism 22 and the ¼ wave plate 23.

The wave plate 25 provided in each of the observation apparatus 1C of the third embodiment (FIG. 5) and the observation apparatus 1D of the fourth embodiment (FIG. 6) is a polarization conversion compensation optical element for reducing polarization conversion occurring in optical elements other than the second prism 22 and the ¼ wave plate 23 in the imaging optical system. The wave plate 25 as the polarization conversion compensation optical element is, for example, a configuration in which a ¼ wave plate and a ½ wave plate are combined, a Babinet-Soleil compensator, a Berek compensator, or the like. By providing the polarization conversion compensation optical element, a more accurate complex amplitude image can be obtained.

Figure 7:
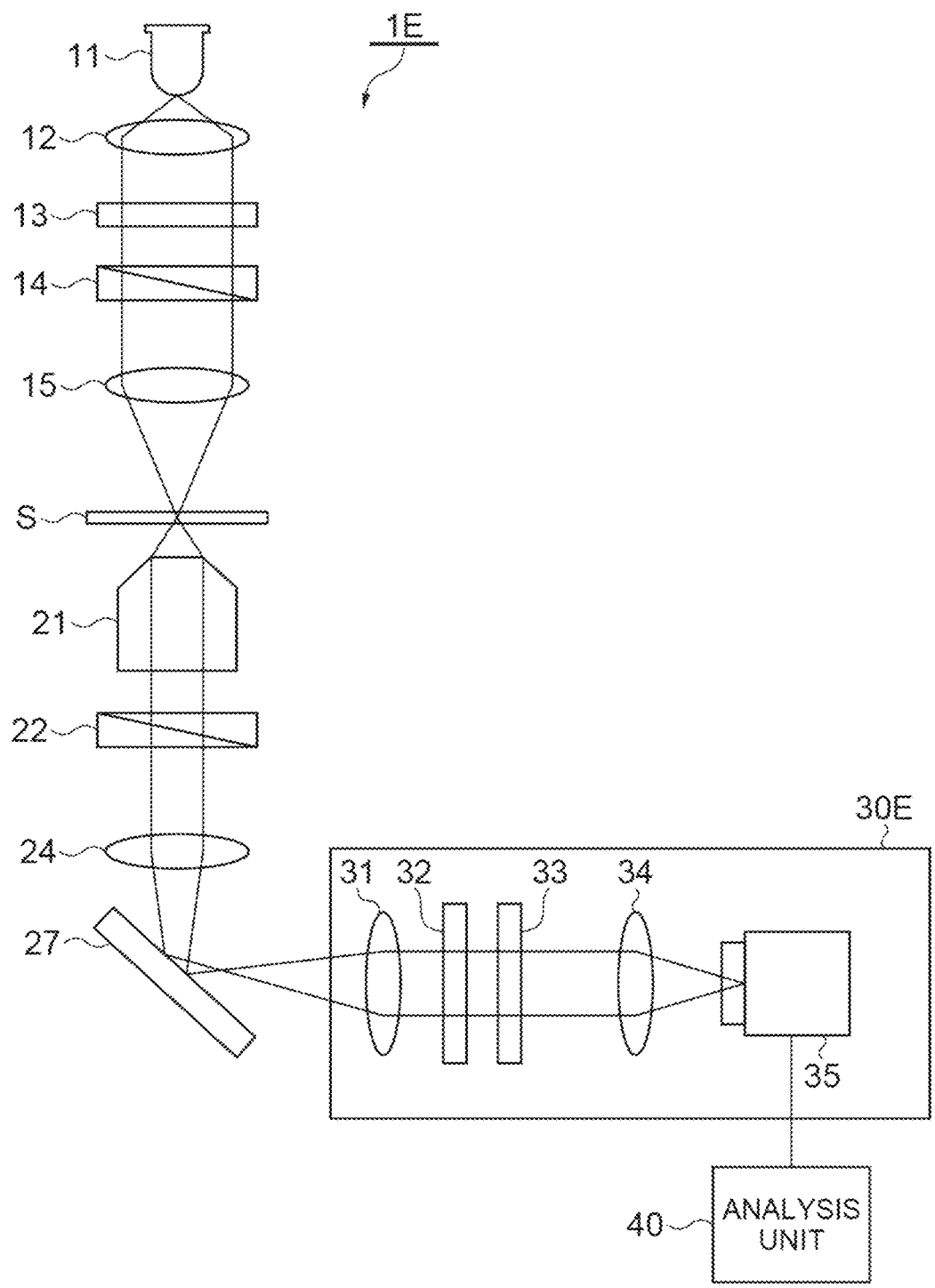
FIG. 7 is a diagram illustrating a configuration of an observation apparatus 1E of a fifth embodiment.

FIG. 7 is a diagram illustrating a configuration of an observation apparatus 1E of a fifth embodiment. As compared with the observation apparatus 1A (FIG. 1) of the first embodiment, the observation apparatus 1E (FIG. 7) of the fifth embodiment is different in the configuration of the imaging optical system from the observation object S to a polarization camera 35. In the present embodiment, the objective lens 21, the second prism 22, the lens 24, a mirror 27, a lens 31, a wave plate (polarization conversion compensation optical element) 32, a ¼ wave plate (polarization conversion element) 33, a lens 34, and the polarization camera 35 are provided in this order on an optical path of the imaging optical system.

The objective lens 21 inputs the two linearly polarized light beams orthogonal to each other and output from the observation object S in response to irradiation of the observation object S with the light by the irradiation optical system, collimates the light beams, and outputs the light beams to the second prism 22.

The second prism 22 is optically coupled to the objective lens 21. The second prism 22 inputs the two linearly polarized light beams orthogonal to each other and collimated and output by the objective lens 21, combines the light beams in the optical paths shifted by the first prism 14, and outputs the light to the lens 24.

The lens 24 is coupled to the second prism 22 and an optical system. The lens 24 inputs the light output from the second prism 22, converges the light, and outputs the light to the mirror 27.

The mirror 27 is optically coupled to the lens 24. The mirror 27 reflects the light output from the lens 24 to the lens 31.

The lens 31 is optically coupled to the mirror 27. The lens 31 inputs the light output from the lens 24 and reflected by the mirror 27, collimates the light, and outputs the light to the wave plate 32. There is an image plane between the lens 24 and the lens 31.

The wave plate 32 is optically coupled to the lens 31. The wave plate 32 is the polarization conversion compensation optical element for reducing polarization conversion occurring in optical elements other than the second prism 22 and the ¼ wave plate 33 in the imaging optical system.

The ¼ wave plate 33 is optically coupled to the wave plate 32, and the ¼ wave plate 33 inputs the light output from the wave plate 32 and outputs the two circularly polarized light beams having different rotation directions.

The lens 34 is optically coupled to the ¼ wave plate 33. The lens 34 inputs the two circularly polarized light beams having different rotation directions output from the ¼ wave plate 33, and forms an image on the imaging plane of the polarization camera 35. The lens 31 and the lens 34 constitute a relay optical system.

The polarization camera 35 is optically coupled to the lens 34. The polarization camera 35 has the imaging plane disposed at a position where the image is formed by the imaging optical system. The polarization camera 35 inputs the two light beams being circularly polarized in different rotation directions by the ¼ wave plate 33, and acquires the interference image on the imaging plane for each of the three or more polarization components. The polarization camera 35 may have the same configuration as the configuration of the polarization camera 26 described with reference to FIG. 2 and FIG. 3.

In the configuration of the present embodiment, a commercially available differential interference contrast microscope can be used for the configuration from the light source 11 to the mirror 27. Further, the lens 31, the wave plate 32, the ¼ wave plate 33, the lens 34, and the polarization camera 35 can be modularized into an optical module 30E being detachably attached to a camera port of the differential interference contrast microscope. By attaching the optical module 30E to the camera port of the commercially available differential interference contrast microscope, the observation apparatus 1E of the present embodiment can be configured at low cost.

Figure 8:
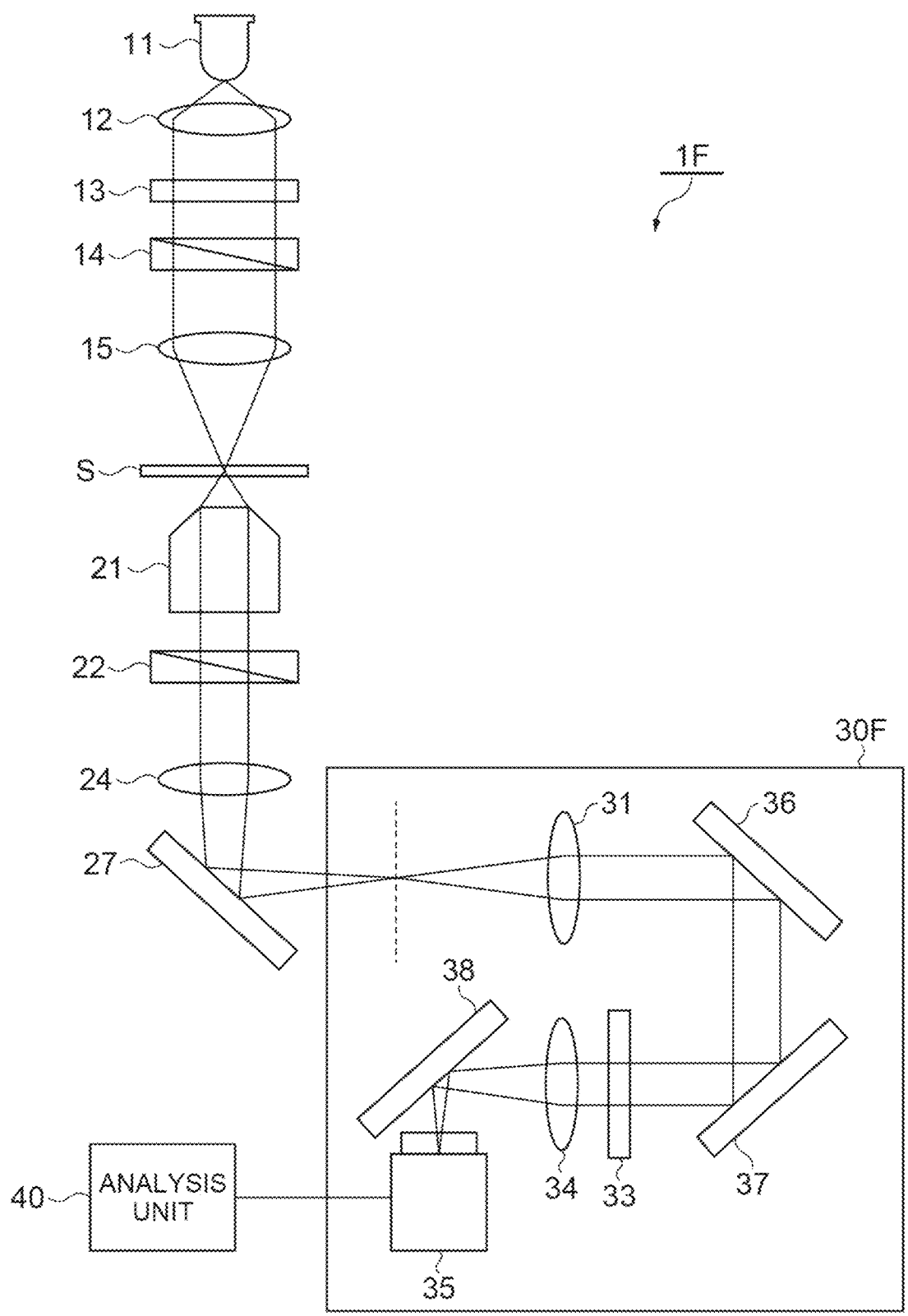
FIG. 8 is a diagram illustrating a configuration of an observation apparatus 1F of a sixth embodiment.

FIG. 8 is a diagram illustrating a configuration of an observation apparatus 1F of a sixth embodiment. As compared with the observation apparatus 1E (FIG. 7) of the fifth embodiment, the observation apparatus 1F (FIG. 8) of the sixth embodiment is different in that an optical module 30F is provided instead of the optical module 30E. As compared with the optical module 30E in the fifth embodiment, the optical module 30F in the sixth embodiment is different in that the wave plate (polarization conversion compensation optical element) 32 is not provided and in that mirrors 36 to 38 are provided.

The mirror 36 and the mirror 37 are provided between the lens 31 and the ¼ wave plate 33. The mirror 36 reflects the light arriving from the lens 31 to the mirror 37. The mirror 37 reflects the light arriving from the mirror 36 to the ¼ wave plate 33. The mirror 38 is provided between the lens 34 and the polarization camera 35. The mirror 38 reflects the light arriving from the lens 34 to the imaging plane of the polarization camera 35.

The mirrors 36 to 38 may be provided simply for reflecting the light, and further, may be preferably provided as the polarization conversion compensation optical element for reducing polarization conversion occurring in optical elements other than the second prism 22 and the ¼ wave plate 33 in the imaging optical system.

Figure 9:
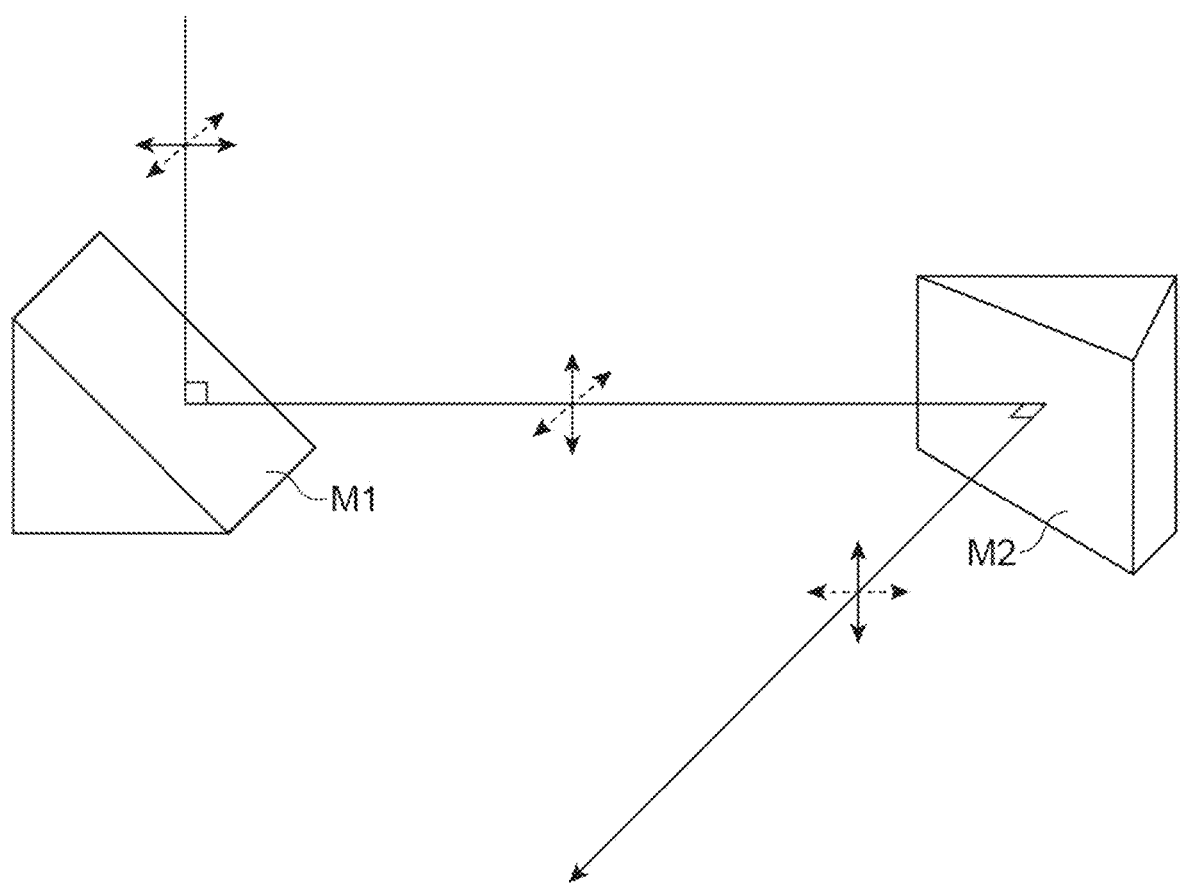
FIG. 9 is a diagram for describing reduction of polarization conversion using two mirrors M1 and M2.

A dielectric multilayer mirror, which is often used, generates polarization conversion when reflecting the light. However, as illustrated in FIG. 9, two dielectric multilayer mirrors M1 and M2 having a property of compensating for the polarization conversion (for example, the same reflection property) are used and incident angles of the light to the mirrors M1 and M2 are equalized, so that a p-polarized component of the light incident on the mirror M1 becomes s-polarized light when incident on the mirror M2, and a s-polarized component of the light incident on the mirror M1 becomes p-polarized light when incident on the mirror M2.

As a result, polarization conversion occurring when each of the two mirrors M1 and M2 reflects the light is canceled out, and polarization conversion can be reduced as a whole. In the present embodiment, when the four mirrors 27, 36 to 38 have the above relationship, polarization conversion can be reduced as a whole.

Figure 10:
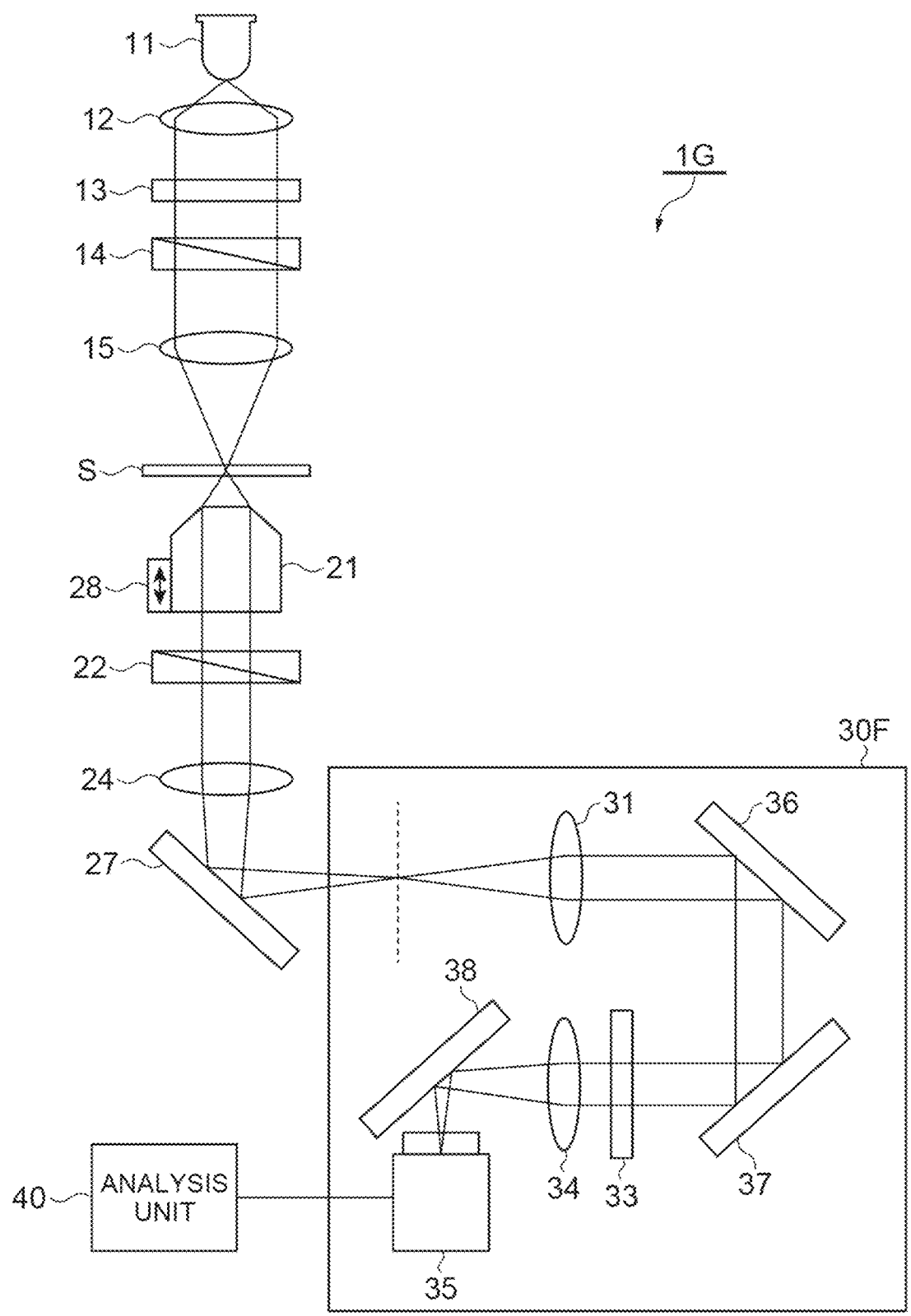
FIG. 10 is a diagram illustrating a configuration of an observation apparatus 1G of a seventh embodiment.

FIG. 10 is a diagram illustrating a configuration of an observation apparatus 1G of a seventh embodiment. As compared with the observation apparatus 1F (FIG. 8) of the sixth embodiment, the observation apparatus 1G (FIG. 10) of the seventh embodiment is different in that a moving unit 28 is further provided. The polarization camera 35 acquires the interference image at each position of movement by the moving unit 28. The analysis unit 40 generates a three-dimensional complex amplitude image of the observation object S based on the interference images acquired by the polarization camera 35 at the respective positions.

The moving unit 28 moves an optical element included in the imaging optical system or the observation object in a direction parallel to the optical axis of the imaging optical system, and preferably moves the objective lens 21 in the optical axis direction. The moving unit 28 may be a linear stage, a piezoelectric actuator, or a combination of a linear stage and a piezoelectric actuator.

The position conjugate to the imaging plane of the polarization camera 35 is scanned in the depth direction in the observation object S by the movement of the objective lens 21 by the moving unit 28, and thus, a three-dimensional phase differential image, a phase image, an amplitude image, and a complex amplitude image of the observation object S can be generated. In addition, a three-dimensional refractive index distribution image of the observation object S can also be reconstructed by performing processing such as deconvolution on the three-dimensional phase differential image or the phase image of the observation object S.

Next, an example will be described. In the example, the observation apparatus 1G (FIG. 10) of the seventh embodiment is used to observe a cell as the observation object.

Figure 11:
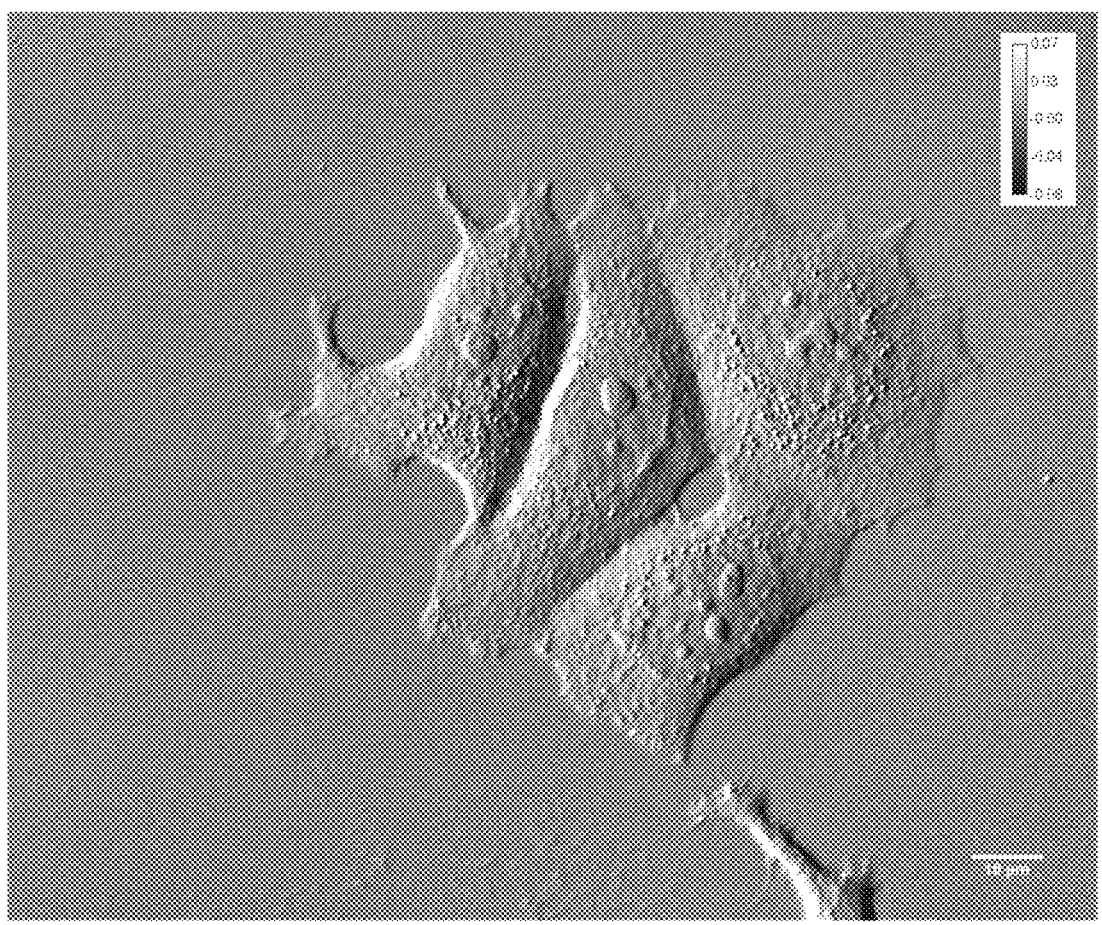
FIG. 11 is a phase differential image obtained in an example.
Figure 12:
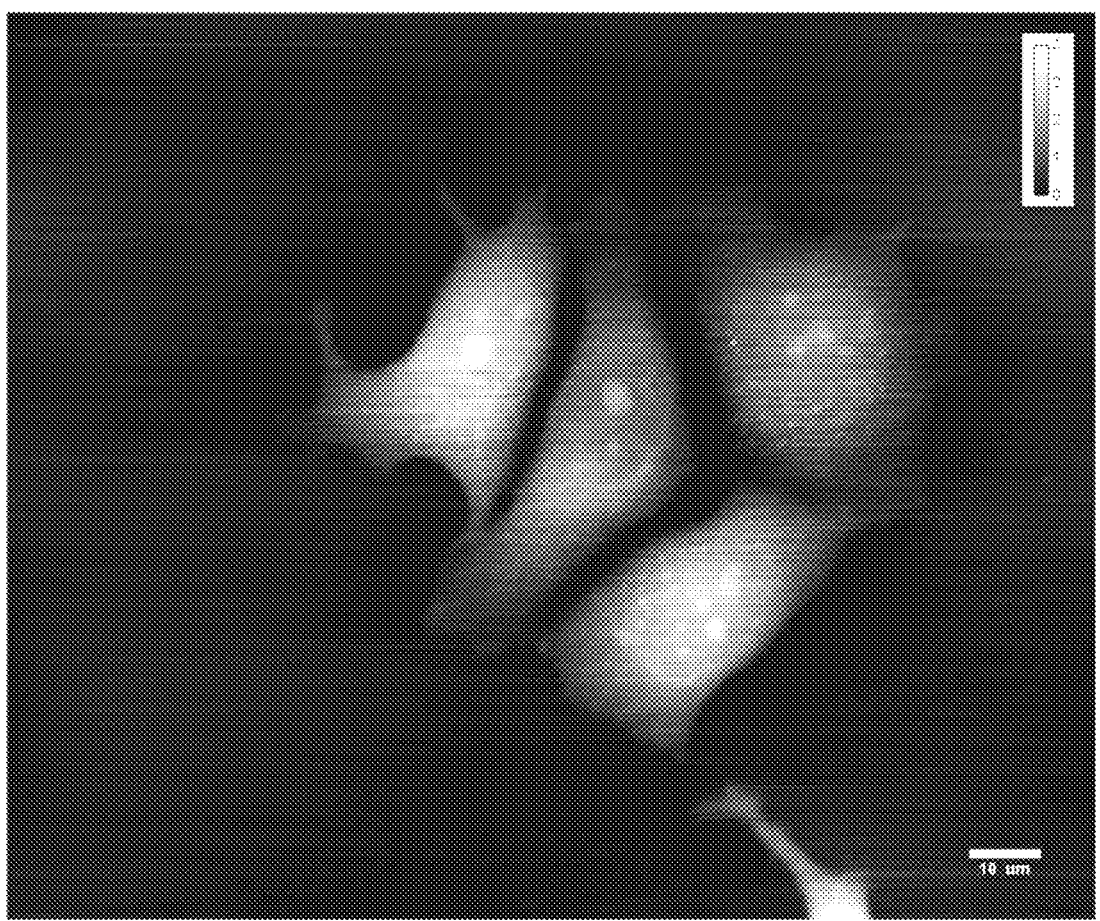
FIG. 12 is a phase image generated from the phase differential image (FIG. 11).
Figure 13:
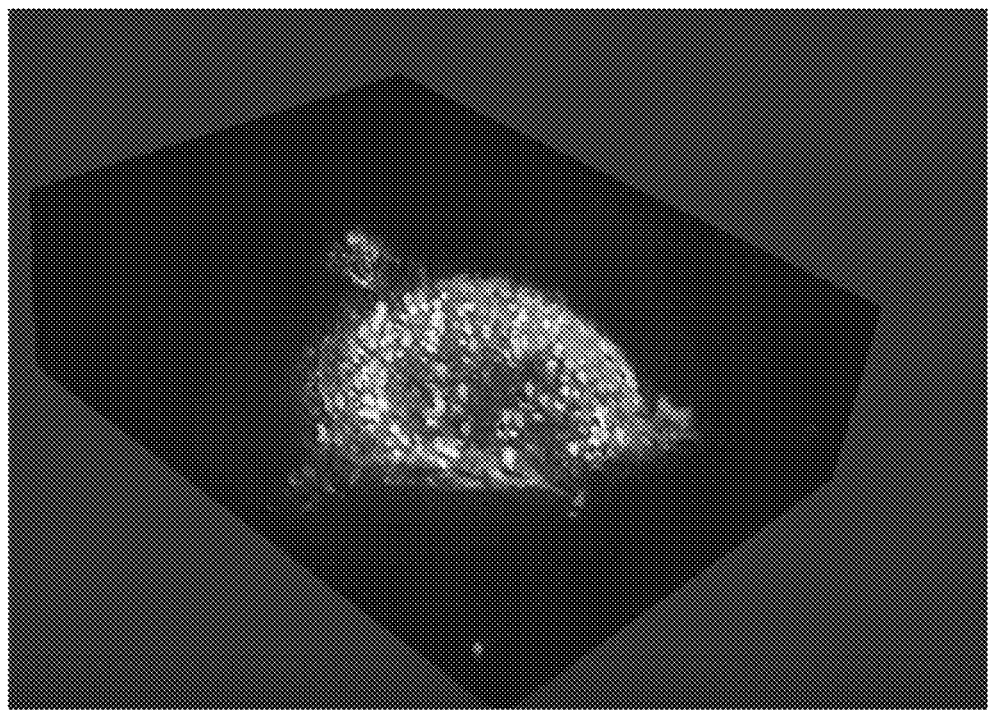
FIG. 13 is a three-dimensional refractive index distribution image generated from the phase image (FIG. 12) acquired at each position in a depth direction.

FIG. 11 is a phase differential image. A shear direction by the first prism 14 (splitting direction of the two linearly polarized light beams orthogonal to each other) is a horizontal direction in this diagram. FIG. 12 is a phase image generated from the phase differential image (FIG. 11). FIG. 13 is a three-dimensional refractive index distribution image generated from the phase image (FIG. 12) acquired at each position in the depth direction. As illustrated in this diagram, a three-dimensional shape of the cell being the observation object can be visualized.

The observation apparatus and the observation method are not limited to the embodiments and configuration examples described above, and various other modifications are possible.

The observation apparatus of the above embodiment includes (1) a light source for outputting spatially incoherent light; (2) an irradiation optical system for focusing light output from the light source and irradiating an observation object with the light; (3) a polarizer provided on an optical path of the irradiation optical system, and for inputting the light output from the light source and outputting linearly polarized light; (4) a first prism provided on the optical path of the irradiation optical system and between the polarizer and the observation object, and for inputting light output from the polarizer and outputting two linearly polarized light beams orthogonal to each other; (5) an imaging optical system for forming an image by inputting light generated in the observation object in response to irradiation of the observation object with the light by the irradiation optical system; (6) a second prism provided on an optical path of the imaging optical system, and for combining two light beams output from the observation object and outputting light; (7) a polarization conversion element provided on the optical path of the imaging optical system and at a subsequent stage of the second prism, and for inputting the light output from the second prism and outputting two circularly polarized light beams having different rotation directions; (8) a polarization camera having an imaging plane disposed at a position where the image is formed by the imaging optical system, and for inputting the two circularly polarized light beams having different rotation directions output from the polarization conversion element and acquiring an interference image on the imaging plane for each of three or more polarization components; and (9) an analysis unit for generating a complex amplitude image of the observation object based on the interference image for each of the three or more polarization components acquired by the polarization camera.

In the above observation apparatus, the polarization conversion element may be a ¼ wave plate. Further, the above observation apparatus may further include a polarization conversion compensation optical element for reducing polarization conversion occurring in an optical element other than the second prism and the polarization conversion element in the imaging optical system.

In the above observation apparatus, the polarization conversion compensation optical element may be a mirror for compensating for a reflection property of a dielectric multilayer mirror provided in the imaging optical system, or a wave plate. Further, in the above observation apparatus, the imaging optical system may include a relay optical system having a mirror, and the polarization conversion compensation optical element may be the mirror included in the relay optical system.

In the above observation apparatus, the imaging optical system may include a relay optical system, and the polarization conversion element may be provided on an optical path of the relay optical system.

In the above observation apparatus, the polarization camera may have a configuration in which a plurality of pixels are arranged two-dimensionally in the imaging plane, and may acquire a two-dimensional interference image.

In the above observation apparatus, the polarization camera may have a configuration in which a plurality of pixels are arranged one-dimensionally in the imaging plane, and may acquire a one-dimensional interference image. Further, in this case, a two-dimensional interference image of the observation object may be acquired by relatively moving the observation object in a direction different from an arrangement direction of the plurality of pixels in the imaging plane of the polarization camera.

The above observation apparatus may further include a moving unit for moving an optical element included in the imaging optical system or the observation object in a direction parallel to an optical axis of the imaging optical system, and the polarization camera may acquire the interference image at each position of movement by the moving unit, and the analysis unit may generate a three-dimensional complex amplitude image of the observation object based on the interference image acquired by the polarization camera at each position.

The optical module of the above embodiment is an optical module being detachably attached to a camera port of a differential interference contrast microscope, and includes (1) a relay optical system constituting a part of an imaging optical system for forming an image by inputting light generated in an observation object placed in the differential interference contrast microscope, and for inputting light output from a second prism of the differential interference contrast microscope through the camera port; (2) a polarization conversion element provided on an optical path of the relay optical system, and for inputting the light and outputting two circularly polarized light beams having different rotation directions; and (3) a polarization camera having an imaging plane disposed at a position where the image is formed by the relay optical system, and for inputting the two circularly polarized light beams having different rotation directions output from the polarization conversion element and acquiring an interference image on the imaging plane for each of three or more polarization components.

In the above optical module, the polarization conversion element may be a ¼ wave plate. Further, the above optical module may further include a polarization conversion compensation optical element for reducing polarization conversion occurring in an optical element other than the second prism and the polarization conversion element in the imaging optical system.

In the above optical module, the polarization conversion compensation optical element may be a mirror for compensating for a reflection property of a dielectric multilayer mirror provided in the imaging optical system, or a wave plate.

In the above optical module, the polarization camera may have a configuration in which a plurality of pixels are arranged two-dimensionally in the imaging plane, and may acquire a two-dimensional interference image.

In the above optical module, the polarization camera may have a configuration in which a plurality of pixels are arranged one-dimensionally in the imaging plane, and may acquire a one-dimensional interference image.

The observation method of the above embodiment includes (1) outputting spatially incoherent light from a light source; (2) by a polarizer provided on an optical path of an irradiation optical system for focusing light output from the light source and irradiating an observation object with the light, inputting the light output from the light source and outputting linearly polarized light; (3) by a first prism provided on the optical path of the irradiation optical system and between the polarizer and the observation object, inputting light output from the polarizer and outputting two linearly polarized light beams orthogonal to each other; (4) by a second prism provided on an optical path of an imaging optical system for forming an image by inputting light generated in the observation object in response to irradiation of the observation object with the light by the irradiation optical system, combining two light beams output from the observation object and outputting light; (5) by a polarization conversion element provided on the optical path of the imaging optical system and at a subsequent stage of the second prism, inputting the light output from the second prism, converting the light into two circularly polarized light beams having different rotation directions and outputting the light beams; (6) by a polarization camera having an imaging plane disposed at a position where the image is formed by the imaging optical system, inputting the two circularly polarized light beams having different rotation directions output from the polarization conversion element and acquiring an interference image on the imaging plane for each of three or more polarization components; and (7) generating a complex amplitude image of the observation object based on the interference image for each of the three or more polarization components acquired by the polarization camera.

In the above observation method, the polarization conversion element may be a ¼ wave plate. Further, the above observation method may further include, by a polarization conversion compensation optical element, reducing polarization conversion occurring in an optical element other than the second prism and the polarization conversion element in the imaging optical system.

In the above observation method, the polarization conversion compensation optical element may be a mirror for compensating for a reflection property of a dielectric multilayer mirror provided in the imaging optical system, or a wave plate. Further, in the above observation method, the imaging optical system may include a relay optical system having a mirror, and the polarization conversion compensation optical element may be the mirror included in the relay optical system.

In the above observation method, the imaging optical system may include a relay optical system, and the polarization conversion element may be provided on an optical path of the relay optical system.

In the above observation method, the polarization camera may have a configuration in which a plurality of pixels are arranged two-dimensionally in the imaging plane, and may acquire a two-dimensional interference image.

In the above observation method, the polarization camera may have a configuration in which a plurality of pixels are arranged one-dimensionally in the imaging plane, and may acquire a one-dimensional interference image. Further, in this case, a two-dimensional interference image of the observation object may be acquired by relatively moving the observation object in a direction different from an arrangement direction of the plurality of pixels in the imaging plane of the polarization camera.

The above observation method may further include moving an optical element included in the imaging optical system or the observation object in a direction parallel to an optical axis of the imaging optical system; acquiring the interference image at each position by the polarization camera; and generating a three-dimensional complex amplitude image of the observation object based on the interference image acquired by the polarization camera at each position.

INDUSTRIAL APPLICABILITY

The embodiments can be used as an observation apparatus and an observation method capable of easily adjusting an optical system and obtaining a complex amplitude image with improved quantitativeness in a short time.

REFERENCE SIGNS LIST 1A-1G—observation apparatus, 11—light source, 12—lens, 13—polarizer, 14—first prism, 15—condenser lens, 21—objective lens, 22—second prism, 23—¼ wave plate (polarization conversion element), 24—lens, 25—wave plate (polarization conversion compensation optical element), 26—polarization camera, 27—mirror, 28—moving unit, 30E, 30F—optical module, 31—lens, 32—wave plate (polarization conversion compensation optical element), 33—¼ wave plate (polarization conversion element), 34—lens, 35—polarization camera, 36-38—mirror, 40—analysis unit.

The invention claimed is:

1. An optical module being used with a differential interference contrast microscope including a first prism, and a second prism provided at a subsequent stage of the first prism, the optical module comprising:
   a relay optical system constituting a part of an imaging optical system configured to form an image by inputting light generated in an observation object placed between the first prism and the second prism in the differential interference contrast microscope, and configured to input light output from the second prism of the differential interference contrast microscope;
   a polarization conversion element provided on an optical path of the relay optical system, and configured to input the light and output two circularly polarized light beams having different rotation directions; and
   a polarization camera having an imaging plane disposed at a position where the image is formed by the relay optical system, and configured to input the two circularly polarized light beams having different rotation directions output from the polarization conversion element and simultaneously acquire three or more interference images on the imaging plane for three or more polarized light components.

2. The optical module according to claim 1, wherein the polarization conversion element is a ¼ wave plate.

3. The optical module according to claim 1 further comprising a polarization conversion compensation optical element provided separately from the polarization conversion element, and configured to reduce polarization conversion occurring in an optical element other than the second prism and the polarization conversion element in the imaging optical system.

4. The optical module according to claim 3, wherein the polarization conversion compensation optical element is a mirror configured to compensate for a reflection property of a dielectric multilayer mirror provided in the imaging optical system, or a wave plate.

5. The optical module according to claim 1, wherein the polarization camera has a configuration in which a plurality of pixels are arranged two-dimensionally in the imaging plane, and is configured to acquire a two-dimensional interference image.

6. The optical module according to claim 1, wherein the polarization camera has a configuration in which a plurality of pixels are arranged one-dimensionally in the imaging plane, and is configured to acquire a one-dimensional interference image.

* * * * *